United States Patent
Seng

(10) Patent No.: US 10,814,277 B2
(45) Date of Patent: Oct. 27, 2020

(54) SELECTIVE CATALYTIC REDUCTION PROCESS AND OFF-LINE REGENERATION OF DEACTIVATED CATALYST OF THE PROCESS

(71) Applicant: SHELL OIL COMPANY, Houston, TX (US)

(72) Inventor: Guido Seng, The Woodlands, TX (US)

(73) Assignee: SHELL OIL COMPANY, Houston, TX (US)

(*) Notice: Subject to any disclaimer, the term of this patent is extended or adjusted under 35 U.S.C. 154(b) by 0 days.

(21) Appl. No.: 16/542,989

(22) Filed: Aug. 16, 2019

(65) Prior Publication Data

US 2020/0061538 A1 Feb. 27, 2020

Related U.S. Application Data

(60) Provisional application No. 62/721,199, filed on Aug. 22, 2018.

(51) Int. Cl.
*B01D 53/96* (2006.01)
*B01D 53/86* (2006.01)
*B01D 53/34* (2006.01)

(52) U.S. Cl.
CPC ........... *B01D 53/96* (2013.01); *B01D 53/346* (2013.01); *B01D 53/8625* (2013.01); *B01D 2257/404* (2013.01)

(58) Field of Classification Search
CPC .. B01D 53/56; B01D 53/565; B01D 53/8625; B01D 53/96; B01D 2257/402; B01D 2257/404; B01D 2258/0283; B01D 2259/400084; B01J 21/20; B01J 23/90; B01J 27/28; B01J 29/90; B01J 37/00; B01J 38/00
See application file for complete search history.

(56) References Cited

U.S. PATENT DOCUMENTS

| | | | | | |
|---|---|---|---|---|---|
| 2,871,195 | A | * | 1/1959 | Melik | B01J 21/20 502/55 |
| 4,656,148 | A | * | 4/1987 | Buhler | B01D 53/8628 422/110 |

(Continued)

FOREIGN PATENT DOCUMENTS

| CN | 102658013 A | 9/2012 | |
|---|---|---|---|
| CN | 101332431 B | * 12/2012 | ............... B01J 38/60 |

(Continued)

OTHER PUBLICATIONS

International Search Report and Written Opinion received for PCT Patent Application No. PCT/US2019/046864, dated Oct. 24, 2019, 10 pages.

(Continued)

*Primary Examiner* — Timothy C Vanoy

(57) ABSTRACT

Presented is a process for the off-line regeneration of a deactivated nitrogen oxide decomposition catalyst of a selective catalytic reduction system that is a component of a flue gas treating system. The selective catalytic reduction system is isolated to allow for removal and replacement of deactivated SCR catalyst. The removed SCR catalyst may be regenerated off-line from the flue gas treating system. The off-line regenerated SCR catalyst can be used as a replacement SCR catalyst.

20 Claims, 2 Drawing Sheets

(56) References Cited

U.S. PATENT DOCUMENTS

| | | |
|---|---|---|
| 5,406,790 A | 4/1995 | Hirota |
| 6,419,889 B1 | 7/2002 | Boxhoorn et al. |
| 8,758,711 B2 | 6/2014 | Yonemura et al. |
| 8,883,106 B2 | 11/2014 | Buschmann et al. |
| 2011/0138788 A1 | 6/2011 | Kanda et al. |

FOREIGN PATENT DOCUMENTS

| | | | | |
|---|---|---|---|---|
| CN | 203856549 U | | 10/2014 | |
| CN | 105688936 A | | 6/2016 | |
| CN | 107088365 A | | 8/2017 | |
| CN | 107913598 A | | 4/2018 | |
| DE | 3426913 A1 | | 1/1986 | |
| EP | 1576999 A1 | | 9/2005 | |
| EP | 1676626 A1 | | 7/2006 | |
| EP | 2687283 A1 | | 1/2014 | |
| EP | 2742990 A1 | | 6/2014 | |
| EP | 3002059 A1 | | 4/2016 | |
| EP | 3002060 A1 | | 4/2016 | |
| JP | H10192657 A | | 7/1998 | |
| JP | 2004330132 A | | 11/2004 | |
| JP | 2005 074408 A | * | 3/2005 | ......... B01D 53/8625 |
| JP | 6563588 B2 | * | 8/2019 | .............. B01J 38/68 |
| KR | 101110665 B1 | | 2/2012 | |
| KR | 20170059159 A | | 5/2017 | |
| WO | WO 03099437 A1 | * | 12/2003 | ......... B01D 53/8625 |
| WO | 2004031546 A3 | | 4/2004 | |
| WO | 2017112615 A1 | | 6/2017 | |
| WO | 2017208502 A1 | | 12/2017 | |

OTHER PUBLICATIONS

International Search Report and Written Opinion received for PCT Patent Application No. PCT/US2019/046888, dated Oct. 24, 2019, 10 pages.

International Search Report and Written Opinion received for PCT Patent Application No. PCT/US2019/046877, dated Nov. 11, 2019, 09 pages.

Sobolewski et al., "Steag's Long-term Catalyst Operating Experience and Cost", Proceedings of the 2006 Environmental Controls Conference, Jan. 2006, pp. 6-7, XP055362117.

* cited by examiner

SELECTIVE CATALYTIC REDUCTION PROCESS AND OFF-LINE REGENERATION OF DEACTIVATED CATALYST OF THE PROCESS

The present Non-Provisional application claims the benefit of U.S. Provisional Patent Application Ser. No. 62/721,199 filed Aug. 22, 2018, the entire disclosure of which is hereby incorporated by reference.

FIELD OF THE INVENTION

This invention relates to a catalytic process for the removal of nitrogen oxides and sulfur oxides from a hot process gas stream, having nitrogen oxides and sulfur oxides, and for regenerating a deactivated catalyst of the process.

BACKGROUND OF THE INVENTION

The combustion of a fuel source, such as coal, oil, gas, wood, municipal waste, industrial waste, hospital waste, hazardous waste and agricultural waste, in furnaces or boilers generates hot flue gases that contain combustion products such as carbon monoxide, carbon dioxide, nitrogen oxides, sulfur compounds, and other contaminants. Included among these other contaminants are particulates. The particulates may include fly ash, dust, smoke, and other fine particulate matter that can comprise phosphorous, heavy metals, alkali metals and alkaline earth metals. The nitrogen oxides ($NO_x$) contained in the hot flue gas streams include nitric oxide (NO) and nitrogen dioxide ($NO_2$). The sulfur compounds include the sulfur oxides ($SO_x$) such as sulfur dioxide ($SO_2$) and sulfur trioxide ($SO_3$). The sulfur compounds result from the presence of sulfur in the combustion fuel.

A common method for removing $NO_x$ from the flue gas streams of combustion processes the selective catalytic reduction (SCR) process. This process involves the catalytic reduction of $NO_x$ to nitrogen ($N_2$) and water ($H_2O$) by reaction of $NO_x$ with ammonia ($NH_3$) within a catalyst bed. The primary reactions of the SCR process are presented as follows:

$$4NO+4NH_3+O_2 \rightarrow 4N_2+6H_2O$$

$$2NO_2+4NH_3+O_2 \rightarrow 3N_2+6H_2O$$

$$NO+NO_2+2NH_3 \rightarrow 2N_2+3H_2O$$

$$6NO_2+8NH_3 \rightarrow 7N_2+12H_2O$$

The catalyst bed usually includes a catalytically active material, such as a nitrogen oxide decomposition catalyst, also referred to herein as deNOx catalyst, that can comprise a metal oxide and a catalytically active metal component such as titanium, tungsten, molybdenum, vanadium or other suitable compounds known to catalyze the conversion of nitrogen oxides to nitrogen and water. Examples of catalytically active materials are vanadium pentoxide ($V_2O_5$) and tungsten trioxide ($WO_3$).

One problem with the use of the deNOx catalyst of the SCR process in treating combustion flue gas streams is that over time they become contaminated and deactivated by the deposition of particulates and reaction products of ammonia with the sulfur compounds of the hot flue gas stream. These products include, for example, ammonium sulfate and ammonium bisulfate. Other ammonium salts, such as ammonium chloride and ammonium nitrate, formed by the reaction of injected ammonia with components of the flue gas stream, also may deposit on the deNOx catalyst. When the deNOx catalyst becomes deactivated due to deposition of ammonium salts, there is a need to regenerate the catalyst to restore at least a portion of its lost activity.

U.S. Pat. No. 8,883,106 describes one method of regeneration of deNOx catalyst. This patent presents a selective catalytic reduction reactor system for removing nitrogen oxides and sulfur oxides from hot process gas. The reactor system has structural features that provide for an on-line process for regenerating its catalytic elements. This system includes multiple catalyst bed segments arranged in parallel with the flow of the hot process gas that is treated by use of the system. The patent further discloses a method of regenerating the catalyst bed segments. The regeneration method includes isolating one of the catalyst bed segments from the flow of hot process gas and passing a regenerating gas through the isolated catalyst bed segment while the other catalyst bed segments are in simultaneous use to remove nitrogen oxide and sulfur oxide from the hot process gas.

EP 2 687 283 describes another method of regeneration of deNOx catalyst. This publication shows a gas treatment system or facility used for nitrogen oxide removal from a gas stream by catalytic reduction of the nitrogen oxides contained in the gas stream. The gas treatment system includes a reactor system having multiple separate reactors or compartments with catalyst structured to allow for the regeneration of the catalyst of an individual reactor or compartment while using the other reactors or compartments with catalyst in the treatment of the gas stream. The system further includes a dechlorination/desulfurization unit that is located upstream of the reactor system and provides for the treatment of the gas stream. The system also includes a gas treatment circuit and a regeneration circuit. The gas treatment circuit provides for the denitrification of the gas stream by supplying the gas stream to and through the catalyst modules of the reactor system while the regeneration circuit provides for the regeneration of a portion of the catalyst of the reactor system by circulating a regeneration gas through its other catalyst modules. The regeneration off-gas is combined with the gas stream fed to the dichlorination/desulfurization treatment.

Some of the problems with these prior art flue gas catalytic denitrification systems that provide for on-line methods of catalyst regeneration arise from the systems having equipment that is structured with separate reactors or compartments. These separate reactors or compartments are isolated from each other to allow for regeneration of a single reactor or compartment simultaneously with the use of the remaining reactors or compartments in treating the flue gas stream. These regeneration methods require complicated structural features that include separate reactors or compartments as well as valving and switching systems that are expensive and difficult to use and to control.

It is an ongoing desire to provide improved catalytic gas treating systems that are easier to use and require less cost than many of the prior art systems.

SUMMARY OF THE INVENTION

Accordingly, the inventive process provides for selective catalytic reduction of nitrogen oxides contained in a gas stream and off-line regeneration of the nitrogen oxide removal catalyst used in the process. The process includes introducing a processed flue gas stream, containing nitrogen oxides and sulfur compounds, into a contacting zone defined by an SCR system that is integrated within a flue gas treating system. The contacting zone contains an SCR catalyst. The processed flue gas stream is contacted with the SCR catalyst for a time sufficient to provide a deactivated SCR catalyst that is deactivated by sulfur compounds. While the processed flue gas stream is contacted with the SCR catalyst, a denitrified flue gas stream is yielded from the SCR system for discharge into a stack. The introducing step is then discontinued by isolating the SCR system having the deactivated SCR catalyst. The deactivated SCR catalyst is then removed from the SCR system to provide removed SCR catalyst that is replaced with spare SCR catalyst. Thereafter, the processed flue gas stream is re-introduced into the contacting zone and contacted with the spare SCR catalyst. The removed SCR catalyst is regenerated off-line from the flue gas treating system to provide a regenerated SCR catalyst for reuse.

DETAIL DESCRIPTION OF THE INVENTION

Figure 1:
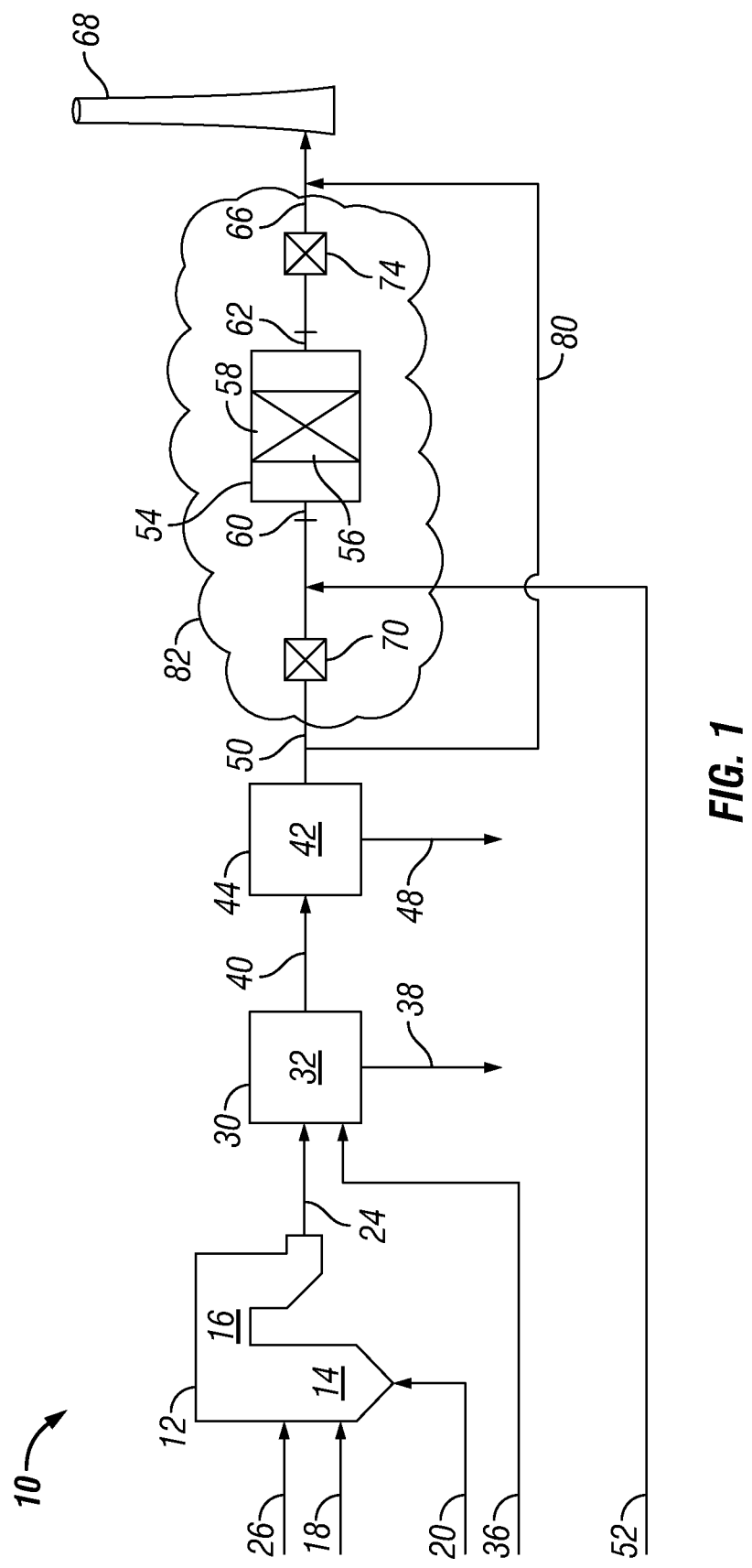
FIG. 1 is a schematic flow diagram illustrating an embodiment of the inventive process.

The invention provides a process for treating combustion flue gases generated by the combustion of a fuel source in a furnace or boiler before passing the combustion flue gases to a flue-gas stack for exhaustion into the outside atmosphere. A typical flue gas stream generated by a furnace or boiler contains nitrogen oxides, sulfur oxides, and particulates that need to be reduced before releasing the flue gas stream into the atmosphere.

A flue gas treating system can include an integrated system of several different types of treating units used to remove different contaminants contained in the flue gas stream. Included among these may be an acid gas removal unit for removing acid gases, such as sulfur oxides ($SO_2$ and $SO_3$) and HCl, from a flue gas stream to provide a desulfurized flue gas stream and a particulates removal unit for removing particulates from the flue gas stream to provide a processed flue gas stream.

The processed flue gas stream contains nitrogen oxides formed by the combustion in the furnace or boiler of the fuel source and are released with the combustion flue gas stream. The processed flue gas stream, thus, comprises nitrogen oxides, such as $N_2O$, $NO$, $NO_2$ and any combination thereof, and unremoved sulfur oxides and particulates. The processed flue gas stream may be passed to a selective catalytic reduction (SCR) system that provides means for removing nitrogen oxides by the catalyzed reduction of $NO_x$ to $N_2$ and water by the reaction $NO_x$ with injected ammonia or urea within a bed of $deNO_x$ catalyst.

The flue gas treating system may also include treatment of the combustion flue gases by selective non-catalytic reduction of the nitrogen oxides. This is done upstream from the SCR system and includes introducing either ammonia or urea into the boiler at a location where the temperature of the hot flue gas is in the range of from 760° C. (1400° F.) to 1090° C. (1994° F.). At these temperatures, urea decomposes to ammonia and the nitrogen oxides react with ammonia and oxygen to form molecular nitrogen and water. The efficiency of the selective non-catalytic reduction is typically low and may be in the range of from 5% to 50% conversion of the nitrogen oxides contained in the hot flue gas.

Whether the hot flue gas stream that is discharged from the boiler is treated by selective non-catalytic reduction, or not treated by selective non-catalytic reduction, the hot flue gas stream contains concentrations of combustion products that include nitrogen oxides, sulfur compounds, and other contaminants. The concentration of the nitrogen oxides in the hot flue gas stream can be in the range of from 50 ppmw to 5,000 ppmw. More typically, however, the nitrogen oxides concentration in the hot flue gas stream is in the range of from 75 ppmw to 500 ppmw. The hot flue gas stream can have a concentration of sulfur compounds in the range of from 10 ppmw to 2,000 ppmw, or, more typically, from 35 ppmw to 350 ppmw. The amount of particulates material contained in the hot flue gas stream generally is in the range of from 0 $mg/m^3$ to 30,000 $mg/m^3$ of the flue gas stream, but, more typically, from 5,000 $mg/m^3$ to 20,000 $mg/m^3$, at standard pressure and temperature conditions.

The hot flue gas stream, comprising at least one acid gas component such as sulfur dioxide and sulfur trioxide ($SO_2$ and $SO_3$), passes from the furnace or boiler and to an acid gas removal unit or system for treating the flue gas stream to remove at least a portion of its acid gas components. The acid gas removal unit of the process, thus, provides means or method for removing from the flue gas stream at least a portion of the acid gas components contained in the flue gas stream.

Any suitable acid gas removal unit known to those skilled in the art may be used to accomplish the removal of acid gas components from the flue gas stream. Common methods for removing acid gas, particularly, sulfur dioxide and sulfur trioxide as well as other acid gas components like hydrogen chloride, from the flue gas stream are by wet scrubbing and dry or semi-dry processes. These processes use either a dry alkaline sorbent or a solution of alkaline sorbent or a slurry of a solid alkaline sorbent to remove the sulfur dioxide, trioxide and other acid gas components from the flue gas stream. A suitable alkaline sorbent of the treatment slurry or solution can be selected from the group of alkaline sorbents consisting of calcium carbonate ($CaCO_3$, limestone), calcium hydroxide ($Ca(OH)_2$ hydrated lime), magnesium hydroxide ($Mg(OH)_2$), and caustic soda (NaOH).

In the wet scrubbing and semi-dry treatment methods for removing acid gases, the flue gas stream is contacted with a slurry or solution of the alkaline sorbent under suitable conditions for removing sulfur from the flue gas stream. Typically, the method uses a vessel that defines a contacting zone within which the sorbent slurry or solution is sprayed concurrently, counter-currently, or cross-currently with the flow of the flue gas stream introduced into the contacting zone of the vessel. The sulfur in the flue gas stream reacts with the alkaline sorbent which removes at least a portion of the sulfur content in the flue gas stream to yield a desulfurized flue gas stream.

Another suitable method for removing acid gases from the flue gas stream includes the so-called dry method. In the suitable dry treatment methods of the invention, an alkaline material such as sodium bicarbonate ($NaHCO_3$), in powder form, is brought into contact with the flue gas stream within a contacting zone defined by a vessel or any other suitable contacting means. The acid gases of the flue gas stream react with the alkaline material within the contacting zone of the vessel to form solid salts that are removed from the contacting zone.

The amount of $SO_2$ contained in the flue gas stream that is removed by the acid gas removal unit can be in the range upwardly to 85%, or up to 95%, or even up to greater than 95% or 99% of the $SO_2$ contained in the flue gas stream. Typically, the amount of $SO_2$ removed from the flue gas stream can be in the range of from 10% to 80%, and, more typically, the $SO_2$ removal is in the range of from 30 to 75%.

While wet acid gas removal systems require a particulate removal system upstream, semi-dry and dry systems do not require a particulate removal system upstream but would have it installed downstream of the acid gas removal unit. In either case, the flue gas stream passes to a particulate removal unit or system for removing at least a portion of the particulates material contained in the flue gas stream. The particulate removal unit is a filtration device that provides means and method for removing particles from the flue gas stream to yield the processed flue gas stream that passes to the SCR system. The SCR system is installed downstream of both the particulate removal unit and the acid gas removal unit.

Any suitable particulates removal system known to those skilled in the art is used to accomplish the removal of the particulates material from the flue gas stream. Thus, the particulates material is removed by any suitable particulates removal means or method. Typical systems, however, include electrostatic precipitators and baghouse filter systems. The electrostatic precipitators remove the particles from the flue gas stream by the application of electrostatic force to separate the particles contained in the flue gas stream. The baghouse filter systems remove the particulates using woven or felted fabric materials as a filter medium.

The particulates contained in the flue gas stream are predominantly in a size range of from 0.5 microns ($\mu$m) to 300 microns ($\mu$m) with greater than 70 wt. % of the particles, and, more particularly, from 70 to 98 wt. % of the particles, having a particle size within the range of from 0.5 $\mu$m to 300 $\mu$m. The baghouse filter systems can remove upwardly to or greater than 99% of the particulates contained in the flue gas stream to provide the processed flue gas stream of the flue gas treating process. Typically, the percentage of particulates removed from the flue gas stream is in the range of from 80% to 99.9% of the particulates to provide the processed flue gas stream ready for processing by a selective catalytic reduction (SCR) system.

The inventive process not only includes the selective catalytic reduction of nitrogen oxides contained in a processed flue gas stream by use of an SCR system, but it further includes a novel method of regenerating the deactivated deNOx catalyst, i.e., the SCR catalyst, of the SCR system of the flue gas treating process. The SCR system is a component of the integrated system of treating units, including the acid gas removal unit and the particulates removal unit, for processing a flue gas stream before its release into the atmosphere.

The SCR system includes structure that defines a contacting zone. The contacting zone of the SCR system contains an SCR catalyst, also referred to herein as deNOx catalyst. The SCR catalyst can be any suitable structural form or shape, such as a honeycomb structure, a ceramic metal or foam structure, or an agglomerate including extrudates, pills, or balls. Preferably, the SCR catalyst is contained within a modular unit, or module, that is capable of being placed or stacked within the contacting zone of the SCR system. The SCR catalyst fills or is packed within the modules that include the SCR catalyst. These modules of SCR catalyst can be any structural arrangement that suitably allows for the flow of gas, such as the processed flue gas stream, over the SCR catalyst to provide for contacting of the gas with the SCR catalyst under deNOx reaction conditions. Thus, the SCR catalyst structures may be oriented within the modules of SCR catalyst to direct the flow of the gas stream over or through the SCR catalyst structure in any desired manner. For instance, the SCR catalyst structure may be oriented within the modules of SCR catalyst to provide for lateral flow of gas across or through the SCR catalyst.

The SCR system is integrated within the flue gas treating system. The flue gas treating system provides for introducing the processed flue gas stream into the contacting zone of the SCR system. The flue gas treating system does this by having an inlet conduit capable of carrying a processed flue gas stream from an upstream treating unit of either the acid gas removal unit or the particulates removal unit to the SCR system, or both. The SCR system is equipped with an upstream inlet providing means for receiving the processed flue gas stream that is carried by the inlet conduit. The inlet conduit of the flue gas treating system and the upstream inlet of the SCR system are operatively connected to provide for fluid flow communication between the upstream treating units of the flue gas treating system and the contacting zone of the SCR system. Thus, the upstream inlet provides means for receiving the processed flue gas stream from the inlet conduit and means for directing the processed flue gas stream into the contacting zone.

The SCR system is further equipped with a downstream outlet providing means for yielding from the contacting zone a treated or denitrified flue gas stream that is discharged into an outlet conduit. The outlet conduit is capable of carrying the denitrified flue gas stream from the SCR system into a stack for discharge. The SCR system does this with the downstream outlet that is operatively connected with the outlet conduit to provide for fluid communication between the contacting zone of the SCR system, the outlet conduit, and the stack.

The modules of SCR catalyst are removable from the contacting zone of the SCR system. They may be placed into or removed from the contacting zone by any suitable means or method. One example of a placement or removal method is for the SCR system to be disconnected from either the inlet conduit or the outlet conduit, or both, to provide an opening that allows for the placement or removal of the modules of SCR catalyst. Once modules are placed inside the contacting zone, the SCR system is reconnected with the inlet conduit and outlet conduit. Thereafter, the processed flue gas stream is re-introduced into the contacting zone.

Another way of providing for the placement and removal of the catalyst modules is for the SCR system to be operatively equipped with a doorway providing means for ingress to and egress from the contacting zone of the catalyst modules. The doorway may be opened allowing for the placement catalyst modules into the contacting zone or the removal of catalyst modules from the contacting zone.

The SCR catalyst of the SCR system can be any deNOx catalyst or catalyst system, known to those skilled in the art, which catalyzes the reduction of nitrogen oxide compounds contained in the flue gas stream to molecular nitrogen and water by the reaction of the nitrogen oxide compounds with ammonia. The SCR system includes an SCR catalyst that is selected from a variety of deNOx catalyst compositions having any suitable structural form or shape.

The SCR catalyst, or deNOx catalyst, can comprise a base metal catalyst, which typically includes titanium oxide or vanadium oxide as a carrier. The carrier may further include another metal oxide. The carrier also may have any suitable shape or structure such as a honeycomb structure, or a ceramic metal or foam structure, or it is an agglomerate, such as an extrudate, a pill, and a ball. The deNOx catalyst can further comprise one or more active metal components selected from the group of metals consisting of vanadium, tungsten, and molybdenum. Other deNOx catalyst compositions can be zeolite-based that typically is used in high-temperature applications, and the deNOx catalyst composition may be a precious metal catalyst for use in low-temperature applications.

U.S. Pat. No. 6,419,889 discloses suitable deNOx catalyst compositions that are useful as the SCR catalyst of the inventive process. This patent is incorporated herein by reference. It describes a titania extrudate particle impregnated with one or more active deNOx metals such as vanadium, molybdenum, and tungsten that may suitably be used as the SCR catalyst of the invention.

Examples of suitable ceramic or metallic foam deNOx catalysts that are useful as the SCR catalyst of the inventive process include those described in WO 2017/112615. This publication is incorporated herein by reference. The ceramic foam is made by filling the pores of a foamed polymer with aqueous slurry of a ceramic material and drying and calcining the wet foam so that the polymer vaporizes or is burned. The metallic foam is made by a powder metallurgical process that converts a nickel or iron foam into a high-temperature alloy. Incorporated onto the ceramic or metal foam is a suitable active deNOx metal as described herein.

U.S. Pat. No. 8,758,711 gives examples of suitable honeycomb structures and deNOx catalyst compositions. This patent is incorporated herein by reference. These catalysts comprise a carrier, having a honeycomb structure with a plurality of through holes providing a reaction flow path. The carrier may further comprise an oxide compound of one or more elements selected from the group consisting of Si, B, P, Zr, and W. Incorporated into the honeycomb structured carrier is an active deNOx metal selected from the group consisting of $V_2O_5$, $WO_3$, and $MoO_3$.

The SCR system is integrated into the flue gas processing system and is capable of functioning as described herein. The SCR system receives the processed flue gas stream, comprising nitrogen oxides and sulfur compounds, that passes from the particulates removal unit. The SCR system provides means and method for removing the nitrogen oxides from the processed flue gas stream to yield a denitrified flue gas stream that preferably is discharged into a stack. Ammonia or urea is introduced into and mixed with the processed flue gas stream that passes to and is introduced into the contacting zone of the SCR system wherein it is contacted with the SCR catalyst under nitrogen oxide reduction, i.e., deNOx, reaction conditions providing for the catalytic reduction of the nitrogen oxides of the processed flue gas stream to nitrogen and water.

Suitable deNOx reaction conditions include a reaction pressure in the range of from −10 kPa (gauge) to 2000 kPa (gauge) and a reaction or contacting temperature in the range of from 130° C. to 450° C. In the normal operation of the SCR system for removal or reduction of NOx contained in the processed flue gas stream, the space velocity is in the range of from 3,000 $hr^{-1}$ to 100,000 $hr^{-1}$, more typically, from 3,000 $hr^{-1}$ to 50,000 $hr^{-1}$, and most typically, from 5,000 $hr^{-1}$ to 20,000 $hr^{-1}$.

The SCR system is operated as a part of the inventive process, which includes passing the processed flue gas stream to the SCR system and introducing it into the contacting zone of the SCR system through the upstream inlet. The denitrified flue gas, having a reduced nitrogen oxides concentration as compared to the processed flue gas stream, is yielded from the SCR system through the downstream outlet of the SCR system and discharged into a stack and to the atmosphere. The processed flue gas stream is contacted with the SCR catalyst for a time that is sufficient to provide a deactivated SCR catalyst. The SCR catalyst becomes deactivated by sulfur compounds through the mechanism described above. During the introduction of the processed flue gas stream into the contacting zone and contacting it with the SCR catalyst, a denitrified flue gas stream passes from the contacting zone through the downstream outlet and is discharged into the stack by way of the outlet conduit.

A typical contacting time for deactivation of the SCR catalyst is in the range of from 1 to 16,000 hours, more typically, the contacting time is in the range of from 200 to 8,000 hours. These deactivation times are for the typical space velocities required for treating the processed flue gas stream.

Once the SCR catalyst becomes deactivated to a level that it is no longer removing nitrogen oxides from the processed flue gas stream to an acceptable or desirable level, passing of the processed flue gas stream to the contacting zone of the SCR system is stopped or discontinued by isolating the SCR system containing the deactivated SCR catalyst that is preferably in modules of the deactivated SCR catalyst.

The SCR system is isolated by any suitable means or method known to those skilled in the art. Preferably, this is done by blocking-off gas flow in the inlet conduit providing gas communication between the upstream inlet of the SCR system and other treatment units of the flue gas processing system and by blocking-off gas flow in the outlet conduit providing gas communication between the downstream outlet of the SCR system and the stack of the flue gas processing system. An upstream damper or valve means provides for blocking or stopping the flow of the processed flue gas stream to the SCR system, and a downstream damper or valve means provides for blocking or stopping the flow of the denitrified gas stream from the SCR system to the stack or atmosphere.

One embodiment of the inventive process includes isolating the SCR system by by-passing the processed flue gas stream around the SCR system as a by-pass stream and passing the by-pass stream to the stack of the flue gas processing system. An advantage of this embodiment of the inventive process is that it allows for the removal of the modules of deactivated SCR catalyst for off-line regeneration without the need to shut-down the operation of the furnace or boiler and other elements of the flue gas processing system. The removed deactivated SCR catalyst, which typically is contained in modules, then may undergo an off-line regeneration while the processed flue gas stream simultaneously passes to the stack.

Once the SCR system is isolated from the rest of the flue gas processing system by discontinuing the introduction into its contacting zone of the processed flue gas, the deactivated SCR catalyst or modules of deactivated SCR catalyst are removed from the SCR system. The SCR system is opened to provide access to the modules of deactivated SCR catalyst which are removed. The removed deactivated SCR catalyst is replaced with spare or replacement modules of SCR catalyst, and the SCR system is then closed and prepared for the re-introduction of the processed flue gas stream.

After the spare or replacement modules of SCR catalyst are installed into the contacting zone of the SCR system, the processed flue gas is reintroduced into the contacting zone and contacted with the SCR catalyst. The re-introduction of the flow of the processed flue gas through the SCR system may be accomplished by opening the upstream inlet damper of the inlet conduit and the downstream outlet damper of the outlet conduit to thereby provide fluid flow communication from the upstream units of the flue gas treating system through the SCR system and downstream to a stack.

The removed deactivated SCR catalyst can be regenerated off-line and separately from the flue gas treating system to provide regenerated SCR catalyst or modules of regenerated SCR catalyst. The deactivated SCR catalyst is regenerated off-line by any suitable means or method. The regeneration is generally done by passing a regeneration gas over the deactivated SCR catalyst under suitable regeneration conditions that provide for the regeneration of the deactivated SCR catalyst or to drive off the deactivated SCR catalyst the contaminating deposits of particulate matter and accumulation of the reaction products of ammonia with sulfur compounds. Any suitable regeneration gas can be used, such as air and denitrified flue gas that is yielded from the flue gas treating system.

The regeneration temperature of the regeneration gas should be greater than 220° C., but, typically, it is in the range of from 220° C. to 500° C. Since the regeneration is performed off-line from the flue gas treating system, the time taken to regenerate the deactivated SCR catalyst is not critical. The regeneration gas can be circulated over the deactivated SCR catalyst for a time-period in the range from 10 hours to 1,000 hours.

In a preferred embodiment of the inventive process, to regenerate the deactivated SCR catalyst, a regeneration gas is passed at a flow rate over the deactivated SCR catalyst under regeneration conditions to yield a regeneration effluent gas that contains $SO_x$ and ammonia, which are regeneration products driven from the deactivated SCR catalyst. At least a portion of the regeneration effluent gas is recycled or recirculated over the deactivated SCR catalyst with the remaining portion of the regeneration effluent gas passing from the deactivated SCR catalyst.

The buildup of the regeneration products from the circulating regeneration effluent gas is removed from the recirculated effluent gas by passing the portion of regeneration effluent gas that is not recycled from the deactivated SCR catalyst that is undergoing regeneration.

One advantage of the off-line regeneration of the deactivated SCR catalyst is that it provides an energy efficient regeneration method requiring less energy usage than many other methods of regeneration. While the temperature of the input regeneration gas must be raised to the required regeneration temperature, since a portion of the regeneration gas includes re-circulated or recycled regeneration effluent, its temperature is already at the regeneration temperature requiring a minimal amount of incremental heat input to maintain the regeneration temperature of the circulating gas. The required incremental heat input approaches that which is needed to increase the temperature of the freshly introduced regeneration gas to the required regeneration temperature and to compensate for heat losses.

It is preferred to control the flow of the regeneration gas stream that is passed over the deactivated SCR catalyst by flow control and to control the circulating regeneration effluent gas also by flow control. The flow rate of the remaining portion of the regeneration effluent should be sufficient to continuously remove regeneration products from the recycle and to prevent buildup of the regeneration products in the recycle. But any suitable means or method may be used to control the flow rate of the regeneration gas over the deactivated SCR catalyst and the recirculation or recycle rate of regeneration effluent gas.

The regeneration temperature of the circulating regeneration effluent gas should be maintained at a regeneration temperature greater than 220° C., preferably, it is in the range of from 220° C. to 500° C., most preferably, from 275° C. to 400° C. Heat energy is introduced, by direct or indirect heat exchange with a heat source, into the regeneration gas or regeneration effluent gas to maintain or control the regeneration temperature.

The inventive process provides for a reduced volume of fresh regeneration gas that is passed over the deactivated SCR catalyst to restore catalytic activity compared to, for example, once-through methods of regeneration. To increase the space velocity and improve the regeneration efficiency of the inventive process, part or all of the regeneration gas is recirculated through the deactivated SCR catalyst instead of applying the use of fresh regeneration gas as a once-through or single-pass regeneration gas. The combination of a reduction in the volumetric flow of fresh regeneration gas required that is passed over the deactivated SCR catalyst and recirculation of regeneration gas reduces the energy required compared to once-through or single pas regeneration.

The regeneration space velocity of the circulating regeneration effluent gas should be less than 3,000 $hr^{-1}$ and, preferably, it is less than 2,500 $hr^{-1}$ and even less than 2,000 $hr^{-1}$. The regeneration space velocity, therefore, typically is in the range of from 10 $hr^{-1}$ to 3,000 $hr^{-1}$, or of from 10 $hr^{-1}$ to 2,500 $hr^{-1}$ or 2,000 $hr^{-1}$. The regeneration pressure within the closed system can be in the range of from −10 kPa to 2,000 kPa.

The regeneration gas is circulated over the deactivated catalyst for a circulation time that is sufficient to regenerate the deactivated SCR catalyst by restoring at least a portion of its reduced activity. The circulation time can be in the range of from 10 hours to 240 hours. More typically, the circulation time is in the range of from 20 hours to 100 hours.

Once a sufficient amount of activity is restored to the deactivated SCR catalyst, the regeneration is stopped by discontinuing passage of the regeneration gas and recycle of regeneration effluent gas.

The regenerated SCR catalyst or modules of regenerated SCR catalyst can be reused in the SCR system of the flue gas treating system of the process. The manner by which the regenerated SCR catalyst or modules of regenerated SCR catalyst are replaced into the contacting zone of the SCR system is the same or similar method as that in use to install the spare catalyst or replacement modules of SCR catalyst into the contacting zone of the SCR system. To install the regenerated catalyst of modules of regenerated catalyst, the reintroduction of the processed flue gas stream into the contacting zone is discontinued by isolating the SCR system that contains the spare SCR catalyst modules of SCR catalyst. The isolation of the SCR system is done in the same or similar manner as described above with respect to the deactivated SCR catalyst.

Once the SCR system is isolated from the rest of the flue gas processing system by discontinuing the introduction into its contacting zone of the processed flue gas, the spare SCR catalyst or replacement modules of SCR catalyst are removed from the SCR system. The SCR system is opened to provide access to the modules of SCR catalyst which are removed. The removed SCR catalyst is replaced with regenerated SCR catalyst or modules of regenerated SCR catalyst, and the SCR system is then closed and prepared for the re-introduction of the processed flue gas stream.

After the regenerated SCR catalyst or modules of regenerated SCR catalyst are installed into the contacting zone of the SCR system, the processed flue gas stream is reintroduced into the contacting zone and contacted with the regenerated SCR catalyst. The re-introduction of the flow of the processed flue gas through the SCR system may be accomplished by opening the upstream inlet damper of the inlet conduit and the downstream outlet damper of the outlet conduit to thereby provide fluid flow communication from the upstream units of the flue gas treating system through the SCR system and downstream to a stack.

FIG. 1 presents a process flow diagram showing an embodiment of the inventive process system 10 that provides for treatment of combustion flue gases generated by furnace or boiler 12. Furnace 12 defines combustion zone 14 and heat transfer zone 16 and provides means for burning or combusting a fuel source. The fuel source is introduced into combustion zone 14 through line 18 and combustion air is introduced through line 20. The combustion generates a hot flue gas stream that is discharged and passes from furnace 12 through line 24. The flue gas stream includes nitrogen oxides, sulfur oxides, and particulates.

The combustion flue gas may be treated in furnace 12 for the removal of nitrogen oxides by the application of a selective non-catalytic reduction reaction within furnace 12. To accomplish this, ammonia or urea is introduced through line 26 into either combustion zone 14 or heat transfer zone 16 at a location where the temperature of the hot flue gas is in the range of from 760° C. to 1,000° C.

The flue gas stream passing through line 24 is introduced into acid gas removal unit 30. In this embodiment of the inventive process, acid gas removal unit 30 first processes the hot flue gas to yield the desulfurized flue gas stream before further processing to remove particulates from the desulfurized flue gas stream. In an alternative embodiment of the inventive process, the order of flue gas treatment is reversed with the hot flue gas first being treated by a particulates removal unit to remove particulates and to provide a cleaned gas stream that is treated by an acid gas removal unit to provide a desulfurized flue gas stream or a processed flue gas stream. In the instant embodiment, acid gas removal unit 30 is of the type known in the art as a dry or semi-dry acid gas removal system, which may use dry sorbent injection. The application of this type of treatment system yields a desulfurized gas stream with no added moisture to the flue gas except that which may be introduced by evaporation from the alkaline sorbent. In the alternative embodiment, the type of acid gas removal unit is a wet scrubber that yields a saturated desulfurized flue gas stream that passes from the acid gas removal unit at its dew point.

Acid gas removal unit 30 defines acid gas removal zone 32 within which the flue gas stream is contacted with a slurry or dry powder of an alkaline sorbent. Acid gas removal unit 30 provides means for contacting the slurry or dry powder of alkaline sorbent that is introduced into acid gas removal zone 32 by way of line 36 with the flue gas stream of line 24 that comprises acid gases. Reaction products of the alkaline sorbent with the acid gases pass from acid gas removal unit 30 through line 38 for further processing or disposal. The portion of reaction products not recovered by acid gas removal unit 30 may pass with the desulfurized gas stream to particulates removal unit 44.

The treatment of the flue gas stream by acid gas removal unit 30 yields a desulfurized flue gas stream that passes from acid gas removal unit 30 by way of line 40 and is introduced into particulates removal zone 42 defined by particulates removal unit 44. Particulates removal unit 44 provides means for removing particulates, including the reaction products from the acid gas removal unit 30, from the desulfurized flue gas stream to yield a processed flue gas stream having a reduced particulates concentration. The removed particulates reaction products from acid gas removal unit 30 pass from particulates removal unit 44 by way of line 48.

The processed flue gas stream passes from particulates removal unit 44 through conduit 50 into which ammonia is introduced by way of line 52 to be mixed with the processed flue gas stream prior to passing the mixture to SCR system 54. SCR system 54 provides means for the catalytic reduction of the nitrogen oxides contained in the processed flue gas stream to molecular nitrogen and water.

SCR system 54 includes structure that defines contacting zone 56, which includes deNOx catalyst 58. The deNOx catalyst 58 may be contained within modules that in combination with other structural elements of SCR system 54 direct or provide for the flow of the processed flue gas stream across deNOx catalyst 58 and provides for contacting of the processed flue gas stream with deNOx catalyst 58.

SCR system 54 has upstream inlet 60 for receiving a feed gas, such as the processed flue gas stream that comprises nitrogen oxide compounds, and downstream outlet 62 for discharging and yielding from SCR system 54 a treated process stream, such as a treated processed flue gas stream or denitrified flue gas stream.

In the process, the processed flue gas stream is introduced into contacting zone 56 wherein it is contacted with deNOx catalyst 58 under suitable deNOx reaction conditions to yield a denitrified flue gas stream. The denitrified flue gas stream passes from contacting zone 56 through conduit 66 to stack 68.

The processed flue gas is contacted with deNOx catalyst 58 for a sufficient contacting time to provide for a deactivated SCR catalyst 58 that is deactivated by sulfur compounds. During this contacting period a denitrified flue gas steam is yielded form contacting zone 56 and passes through downstream outlet 62 and through conduit 66 to stack 68. Once deNOx catalyst 58 is sufficiently deactivated, charging of the processed flue gas stream to SCR system 54 is stopped and SCR system 54 is isolated to provide isolated or closed system 69.

To isolate SCR system 54, upstream damper or valve means 70 is interposed into conduit 50 at a location between the outlet of particulates removal unit 44 and upstream inlet 60 of SCR system 54, and downstream damper or valve means 74 is interposed into conduit 66 at a location between downstream outlet 62 of SCR system 54 and stack 68. Both upstream damper 70 and downstream damper 74 are closed to block-off gas flow communication to and from SCR system 54.

In one embodiment of the process, by-pass line 80 provides for flow of the processed flue gas stream passing from particulates removal unit 44 to by-pass SCR system 54. By-pass line 80 provides gas flow communication from conduit 50 at a location between the outlet of particulates removal unit 44 and the inlet of upstream damper 70 to conduit 66 at a location between the outlet of downstream damper 74 and stack 68. When SCR system 54 is isolated by closing both upstream damper 70 and downstream damper 74, the processed flue gas stream passes from particulates removal unit 44 and by-passes SCR system 54 by way of line 80 to conduit 66 and stack 68.

In an alternative embodiment of the process, the entire system is shut by shutting down boiler 12. This stops the flow of the processed flue gas stream through conduit 50 and allows for the removal of the deactivated SCR catalyst or modules of deactivated SCR catalyst 58 from SCR system 54 without by-passing the flow of the processed flue gas stream around SCR system 54.

Figure 2:
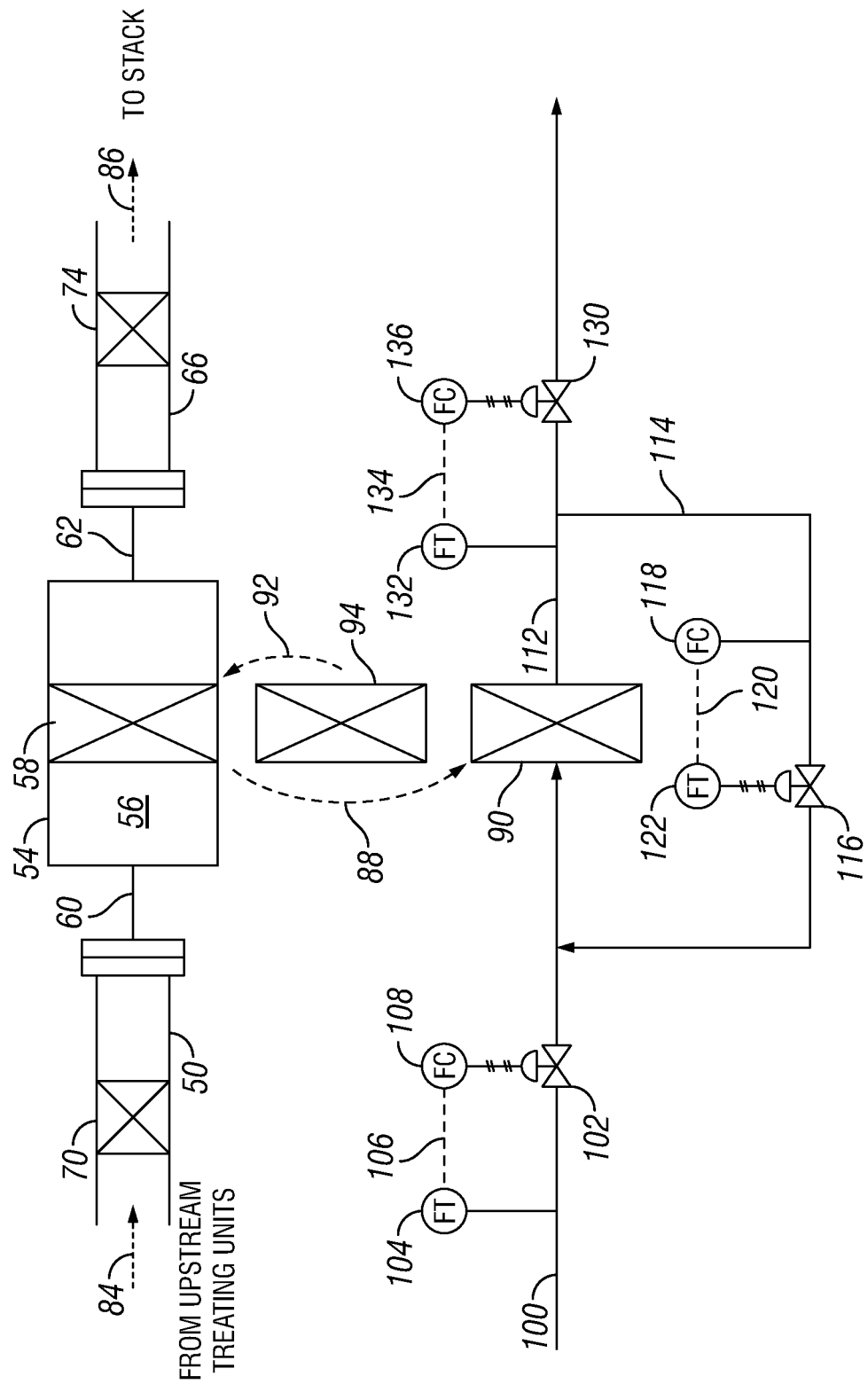
FIG. 2 is a schematic of an enlarged portion of the flow diagram of FIG. 1 showing additional detail surrounding the selective catalytic reduction system of the flue gas treating system of the process.

Referring now to FIG. 2, presented is an enlarged version of system 82 identified in FIG. 1 and pictured in FIG. 2 with enhanced detail to better illustrate the steps of isolating SCR system 54, removing the deactivated SCR catalyst 58 from SCR system 54, replacing the deactivated SCR catalyst 58 with spare SCR catalyst or replacement modules of SCR catalyst 90, and regenerating the deactivated SCR catalyst 58.

During the normal operation of SCR system 54, the flow of the processed flue gas stream shown by arrow 84 passes through inlet conduit 50 and upstream inlet 60 of SCR system 54 and is introduced into contacting zone 56. Inlet conduit 50 is capable of carrying the processed flue gas stream 84, which contains nitrogen oxides and sulfur compounds, from the upstream units of process system 10 for introduction into contacting zone 56. The upstream treating units include, for example, particulates removal unit 44. Upstream inlet 60 is operatively connected to inlet conduit 50 and provides means for receiving the process flue gas stream into contacting zone 56. Interposed in inlet conduit 50 is upstream damper 70, which provides means for stopping and controlling the flow of the processed flue gas stream 84.

Processed flue gas stream 84 passes through inlet conduit 50 and upstream inlet 60 for introduction, along with ammonia or urea, into contacting zone 56. Contacting zone 56 operates under reaction conditions that promote the $NO_x$ reduction reactions as discussed in detail elsewhere herein. SCR system 54 also is equipped with downstream outlet 62 that is operatively connected to outlet conduit 66. Downstream outlet 62 provides means for discharging the denitrified flue gas stream from contacting zone 56 into outlet conduit 66. Outlet conduit 66 provides for carrying the denitrified flue gas stream from SCR system 54 to stack 68. Arrow 86 shows the flow of denitrified flue gas stream. Interposed in outlet conduit 66 is damper 74, which provides means for stopping and controlling the flow of the denitrified flue gas stream from SCR system 54.

SCR catalyst 58 becomes deactivated over time by passing the processed flue gas stream into contacting zone 56 and contacting the processed flue gas stream with SCR catalyst 58 that is either loose or contained within modules. This contacting step continues for a time-period until SCR catalyst 58 becomes deactivated by deposits and contaminants, such as sulfur compounds and particulate matter. To replace the deactivated SCR catalyst 58, introduction of the processed flue gas stream into contacting zone 56 is first discontinued by isolating SCR system 54. SCR system 54 is isolated by closing both upstream damper 70 to shut-off the flow of the processed flue gas stream to SCR system 54 and downstream damper 74 to shut-off the flow of denitrified flue gas stream to stack 68.

The isolated SCR system 54 is opened in a manner that allows access into contact zone 56 for removal of deactivated SCR catalyst or modules of deactivated SCR catalyst 58. Arrow 88 represents the removal of deactivated SCR catalyst 58 and placing it off-line from the flue gas treating system as deactivated and removed SCR catalyst 90. Arrow 92 represents the replacement of deactivated and removed SCR catalyst 58 with spare or modules of replacement SCR catalyst 94. After the replacement SCR catalyst or modules 94 are placed within contacting zone 56, isolated SCR system 54 is closed and prepared for re-introduction of the processed flue gas stream. Upstream damper 70 and downstream damper 74 are then re-opened to reestablish fluid flow communication through inlet conduit 50, SCR system 54, and outlet conduit 66 and to stack 68.

The removed or deactivated SCR catalyst 90 is available for off-line regeneration. The off-line regeneration includes regeneration of deactivated or removed SCR catalyst 90 separately from the flue gas treating process system 10. The off-line regeneration of deactivated and removed SCR catalyst 90 is done by passing a regeneration gas through conduit 100 over removed SCR catalyst 90 under regeneration conditions to regenerate the deactivated SCR catalyst 90.

The regeneration gas is selected from any suitable gas that can provide for regeneration as described herein of deactivated SCR catalyst. Air is one suitable regeneration gas, but the preferred embodiment of the invention uses denitrified flue gas passing from SCR system 54 and through conduit 66 or otherwise provided by flue gas treating process system 10 from which removed SCR catalyst 90 is obtained. Indeed, this is one benefit of the inventive process that it provides for off-line regeneration of the removed SCR catalyst 90 concurrently with the operation of flue gas treating process system 10, and it provides for the use of denitrified flue gas yielded from this system. The inventive process further provides, as described elsewhere herein, for a significant reduction in the total energy required to regenerate deactivated SCR catalyst.

Interposed within line 100 is control valve 102 that provides means for controlling the rate at which the regeneration gas passes over removed SCR catalyst 90. The rate of flow of the regeneration gas is measured by flow sensor and transmitter means 104. Flow transmitter means 104 provides signal 106 to flow controller 108 that is representative of the rate of flow of regeneration gas passing through line 100. Flow controller 108 compares this measured flow rate against a desired flow rate to thereby provide a differential flow rate. Flow controller 108 adjusts control valve 102 in response to the differential flow rate to maintain the rate of flow of regeneration gas passing through line 100 and passing over removed SCR catalyst 90 at the desired flow rate.

The regeneration gas passes to the removed SCR catalyst 90 through conduit 100 at a flow rate to provide for regeneration of the removed SCR catalyst 90 and to yield a regeneration effluent gas that contains SOx and ammonia. The regeneration effluent gas passes from removed SCR catalyst 90 through conduit 112.

In a preferred embodiment, at least a portion of the regeneration effluent gas is recycled or recirculated through conduit 114 and combined with the fresh regeneration gas passing through conduit 100 with the combined flows passing to removed SCR catalyst 90. This recycling of a portion of regeneration effluent gas provides the energy saving benefits as described elsewhere herein. Recycling of the regeneration effluent gas reduces the amount of fresh regeneration gas required over the amount required for the application of once-through regeneration of the deactivated catalyst. The remaining portion of the regeneration effluent gas that is not recycled preferably passes downstream for discharge such as into stack 68.

The circulation rate of the recycled or recirculated regeneration effluent gas passing through recycle conduit 114 can be controlled by controlled valve 116. Interposed in recycle conduit 114 is control valve 116, which provides means for controlling the circulation rate of the recycled regeneration effluent gas. Flow sensor and transmitter means 118 measures the recirculation rate of the regeneration effluent gas passing through conduit 114 and provides signal 120 to flow controller 122 that is representative of the rate of circulation of the recycled regeneration effluent gas. Flow controller 122 compares this measured rate of recirculation against a desired rate of recirculation to thereby provide a differential flow rate. Flow controller 122 adjusts control valve 116 in response to the differential flow rate to maintain the rate of flow of the recirculated regeneration effluent gas passing through recycle conduit 114 at the desired circulation rate.

In order to continuously remove regeneration products from the circulating regeneration effluent gas and to prevent excessive buildup of regeneration products, the remaining portion of the regeneration effluent gas passes to downstream from removed SCR catalyst 90 by way of conduit 112. Regeneration gas is continuously passed over SCR catalyst 90 through conduit 100 while a bleed stream of regeneration effluent gas is simultaneously passed to downstream through conduit 112.

In one embodiment of the invention, the pressure of the off-line regeneration system is controlled with pressure control valve 130, which is interposed in conduit 112 downstream from recycle conduit 114. Pressure sensor and transmitter means 132 measures the pressure of the off-line regeneration system and provides signal 134 that is representative of the actual pressure of the off-line regeneration system to pressure controller means 136. Pressure controller means 136 compares the measured pressure against a desired system pressure to provide a differential pressure. Pressure controller means 136 adjusts pressure control valve 130 in response to the differential pressure to maintain the pressure of the off-line regeneration system at the desired pressure.

Once a sufficient amount of activity is restored to the deactivated and removed SCR catalyst 90, the regeneration is stopped by discontinuing passage of the regeneration gas through line 100 over removed SCR catalyst 90 and discontinuing the recycle of the regeneration effluent gas through conduit 114. The regenerated SCR catalyst is ready for reuse in SCR system 54.

That which is claimed is:

1. A process for selective catalytic reduction of nitrogen oxides contained in a gas stream and off-line regeneration of nitrogen oxide removal catalyst, wherein the process comprises:
   introducing a processed flue gas stream, containing nitrogen oxides and sulfur compounds, into a contacting zone defined by an SCR system that is integrated within a flue gas treating system, wherein the contacting zone contains an SCR catalyst, and contacting the processed flue gas stream with the SCR catalyst for a time sufficient to provide a deactivated SCR catalyst that is deactivated by sulfur compounds, and while contacting the processed flue gas stream with the SCR catalyst, yielding from the SCR system a denitrified flue gas stream for discharge into a stack;
   discontinuing the introducing step to the SCR system having the deactivated SCR catalyst;
   removing the deactivated SCR catalyst from the SCR system to provide removed SCR catalyst; and
   regenerating off-line from the flue gas treating system the removed SCR catalyst to provide a regenerated SCR catalyst, wherein the regenerating step comprises passing at a flow rate a regeneration gas over the removed SCR catalyst under regeneration conditions to yield a regeneration effluent gas containing SOx and ammonia, recirculating at a circulation rate at least a portion of the regeneration effluent gas over the removed SCR catalyst, and passing a remaining portion of the regeneration effluent gas from the removed SCR catalyst.

2. The process as recited in claim 1, comprising isolating of the SCR system by by-passing the processed flue gas stream around the SCR system as a by-pass stream and passing the by-pass stream to the stack before removing the deactivated SCR catalyst from the SCR system.

3. The process as recited in claim 2, comprising:
   discontinuing the step of re-introducing the processed flue gas stream into the contacting zone by isolating the SCR system having the spare SCR catalyst;
   removing the spare SCR catalyst from the SCR system and replacing therewith the regenerated SCR catalyst; and
   thereafter, re-introducing the processed flue gas stream into the contacting zone of the SCR system containing the regenerated SCR catalyst.

4. The process as recited in claim 3, wherein the isolating of the SCR system having the spare SCR catalyst includes by-passing the processed flue gas stream around the SCR system as a second by-passed stream and passing the second by-pass stream to the stack before removing the spare SCR catalyst from the SCR system; and, wherein after replacing the spare SCR system with the regenerated SCR catalyst, discontinuing the by-passing step.

5. The process as recited in claim 1, further comprising:
   introducing heat energy into the at least a portion of the regeneration effluent gas to thereby control a regeneration temperature of the regeneration gas.

6. The process as recited in claim 5, further comprising:
   measuring the flow rate of the regeneration gas to provide a measured flow rate and comparing the measured flow rate against a desired flow rate to provide a differential flow rate; and
   adjusting the flow rate in response to the differential flow rate.

7. The process as recited in claim 6, further comprising:
   measuring the circulation rate of at least a portion of the regeneration effluent gas to provide a measured circulation rate and comparing the measured circulation rate against a desired circulation rate to provide a differential circulation rate; and
   adjusting the circulation rate in response to the differential circulation rate to maintain the recirculation of at least a portion of the regeneration effluent gas at the desired circulation rate.

8. The process as recited in claim 7, further comprising:
   discontinuing the passing of the regeneration gas the removed SCR catalyst after a sufficient time period to provide the regenerated catalyst.

9. The process as recited in claim 1, further comprising:
   introducing heat energy into the regeneration gas to thereby control a regeneration temperature of the regeneration gas.

10. The process as recited in claim 1, comprising replacing the deactivated SCR catalyst with spare SCR catalyst, and thereafter re-introducing the processed flue gas stream into the contacting zone and contacting the processed flue gas stream with the spare SCR catalyst.

11. A process for selective catalytic reduction of nitrogen oxides contained in a gas stream and off-line regeneration of nitrogen oxide removal catalyst, wherein the process comprises:
   providing within a flue gas treating system an inlet conduit configured to carry a processed flue gas stream, containing nitrogen oxides and sulfur compounds, from an upstream treating unit of the flue gas treating system to an SCR system and an outlet conduit configured to carry a denitrified flue gas stream from the SCR system of the flue gas treating system for discharge into a stack;

wherein the SCR system defines a contacting zone containing modules of SCR catalyst, and wherein the SCR system has an upstream inlet for receiving the processed flue gas stream and a downstream outlet for discharging from the contacting zone the denitrified flue gas stream, and wherein the modules of SCR catalyst are removable from the SCR system;

introducing the processed flue gas stream from the inlet conduit through the upstream inlet into the contacting zone and contacting the processed flue gas stream with the SCR catalyst of the modules of SCR catalyst for a time sufficient to provide a deactivated SCR catalyst that is deactivated by sulfur compounds, and while introducing the processed flue gas stream into the contacting zone, yielding from the contacting zone the denitrified flue gas stream through the downstream outlet for discharge into the outlet conduit;

discontinuing the step of introducing the processed flue gas stream into the contacting zone containing modules of deactivated SCR catalyst;

opening the SCR system and removing the modules of deactivated SCR catalyst from the contacting zone, replacing the removed modules of deactivated SCR catalyst with replacement modules of SCR catalyst, and thereafter closing the SCR system;

re-introducing the processed flue gas stream through the inlet conduit and into the contacting zone containing the replacement modules of SCR catalyst; and regenerating off-line from the flue gas treating system the deactivated SCR catalyst of the modules of deactivated SCR catalyst to provide modules of regenerated SCR catalyst, wherein the regenerating step comprises passing a regeneration gas over the deactivated SCR catalyst under regeneration conditions to yield a regeneration effluent gas containing SOx and ammonia, and recirculating at least a portion of the regeneration effluent gas over the deactivated SCR catalyst.

12. The process as recited in claim 11, wherein the inlet conduit further includes interposed inlet damper means for stopping and controlling flow of the processed flue gas stream, and wherein the outlet conduit further includes interposed outlet damper means for stopping and controlling flow of the denitrified flue gas stream, and wherein the isolating of the SCR system includes stopping the passing of the processed flue gas stream into the contacting zone, stopping the yielding from the contacting zone the denitrified flue gas stream, and by-passing the processed flue gas stream around the SCR system as a by-pass stream and passing the by-pass stream to the stack before removing the modules of deactivated SCR catalyst from the contacting zone; wherein after replacing the modules of deactivated SCR catalyst with the replacement modules of SCR catalyst, thereafter discontinuing the by-passing of the processed flue gas stream around the SCR system.

13. The process as recited in claim 12, further comprising:
discontinuing the step of re-introducing the processed flue gas stream into the contacting zone by isolating the SCR system having the replacement modules of SCR catalyst;

removing the replacement modules of SCR catalyst from the SCR system and replacing therewith modules of regenerated SCR catalyst; and thereafter, re-introducing the processed flue gas stream into the contacting zone of the SCR system containing the modules of regenerated SCR catalyst.

14. The process as recited in claim 13, wherein the isolating of the SCR system having the replacement modules of SCR catalyst includes stopping the passing of the processed flue gas stream into the contacting zone, stopping the yielding from the contacting zone the denitrified flue gas stream, and by-passing the processed flue gas stream around the SCR system as a by-pass stream and passing the by-pass stream to the stack before removing the modules of replacement modules of SCR catalyst from the contacting zone; wherein after replacing the replacement modules of SCR catalyst with the modules of regenerated SCR catalyst, thereafter discontinuing the by-passing of the processed flue gas stream around the SCR system.

15. A process for selective catalytic reduction of nitrogen oxides, comprising:
introducing a processed flue gas stream, containing nitrogen oxides and sulfur compounds, into a contacting zone defined by an SCR system that is integrated within a flue gas treating system, wherein the contacting zone comprises an SCR catalyst configured to remove the nitrogen oxides contained in the processed flue gas stream and to generate a denitrified flue gas stream;

contacting the processed flue gas stream with the SCR catalyst for a time sufficient to provide a deactivated SCR catalyst; and regenerating the deactivated SCR catalyst to provide a regenerated SCR catalyst, wherein the regenerating step comprises passing a regeneration gas over the deactivated SCR catalyst under regeneration conditions to yield a regeneration effluent gas containing SOx and ammonia, recirculating at least a portion of the regeneration effluent gas over the deactivated SCR catalyst, and passing a remaining portion of the regeneration effluent gas from the deactivated SCR catalyst.

16. The process as recited in claim 15, wherein a temperature of the regeneration gas is between 220° C. and 500° C.

17. The process as recited in claim 15, comprising measuring a flow rate of the regeneration gas to provide a measured flow rate, comparing the measured flow rate against a desired flow rate to provide a differential flow rate, and adjusting the flow rate in response to the differential flow rate.

18. The process as recited in claim 15, comprising measuring a circulation rate of the portion of the regeneration effluent gas to provide a measured circulation rate, comparing the measured circulation rate against a desired circulation rate to provide a differential circulation rate, and adjusting the circulation rate in response to the differential circulation rate to maintain the recirculation of the portion of the regeneration effluent gas at the desired circulation rate.

19. The process as recited in claim 15, wherein the deactivated SCR catalyst is regenerated off-line.

20. The process as recited in claim 15, comprising discontinuing a flow of the processed flue gas into the contacting zone of the SCR system after the time sufficient to provide the deactivated SCR catalyst and before the regeneration step.

* * * * *